United States Patent
Umamageswaran et al.

(10) Patent No.: US 10,430,338 B2
(45) Date of Patent: Oct. 1, 2019

(54) SELECTIVELY READING DATA FROM CACHE AND PRIMARY STORAGE BASED ON WHETHER CACHE IS OVERLOADED

(75) Inventors: Kothanda Umamageswaran, Sunnyvale, CA (US); Juan R. Loaiza, Woodside, CA (US); Umesh Panchaksharaiah, Richmond, CA (US); Alexander Tsukerman, Foster City, CA (US); Timothy L. Shetler, San Francisco, CA (US); Bharat C. V. Baddepudi, San Jose, CA (US); Boris Erlikhman, Mountain View, CA (US); Kiran B. Goyal, Foster City, CA (US); Nilesh Choudhury, Belmont, CA (US); Susy Fan, Palo Alto, CA (US); Poojan Kumar, Mountain View, CA (US); Selcuk Aya, Redwood, CA (US); Sue-Kyoung Lee, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1500 days.

(21) Appl. No.: 12/691,146

(22) Filed: Jan. 21, 2010

(65) Prior Publication Data

US 2010/0122026 A1    May 13, 2010

Related U.S. Application Data

(63) Continuation-in-part of application No. 12/631,985, filed on Dec. 7, 2009, now Pat. No. 8,868,831, and a
(Continued)

(51) Int. Cl.
*G06F 12/08* (2016.01)
*G06F 12/084* (2016.01)
(Continued)

(52) U.S. Cl.
CPC ........ *G06F 12/084* (2013.01); *G06F 12/0888* (2013.01); *G06F 16/24552* (2019.01);
(Continued)

(58) Field of Classification Search
None
See application file for complete search history.

(56) References Cited

U.S. PATENT DOCUMENTS 4,425,615 A * 1/1984 Swenson et al. ............. 711/114
5,717,893 A    2/1998 Mattson
(Continued)

FOREIGN PATENT DOCUMENTS

CN    101150483 A    3/2008
GB    2409 301 A    6/2005
(Continued)

OTHER PUBLICATIONS

PCT/US2009/057526 Internationational Search Report and Written Opinion dated Sep. 18, 2009, 17 pages.
(Continued)

*Primary Examiner* — Kevin Verbrugge
(74) *Attorney, Agent, or Firm* — Hickman Palermo Becker Bingham LLP

(57) ABSTRACT

Techniques are provided for using an intermediate cache to provide some of the items involved in a scan operation, while other items involved in the scan operation are provided from primary storage. Techniques are also provided for determining whether to service an I/O request for an item with a copy of the item that resides in the intermediate cache based on factors such as a) an identity of the user for whom the I/O request was submitted, b) an identity of a service that submitted the I/O request, c) an indication of a consumer group to which the I/O request maps, d) whether the I/O request is associated with an offloaded filter provided by the
(Continued)

database server to the storage system, or e) whether the intermediate cache is overloaded. Techniques are also provided for determining whether to store items in an intermediate cache in response to the items being retrieved, based on logical characteristics associated with the requests that retrieve the items.

18 Claims, 6 Drawing Sheets

Related U.S. Application Data continuation-in-part of application No. 12/563,073, filed on Sep. 18, 2009, now Pat. No. 8,145,806, and a continuation-in-part of application No. 12/562,984, filed on Sep. 18, 2009, now Pat. No. 8,825,678.

(60) Provisional application No. 61/250,384, filed on Nov. 9, 2009, provisional application No. 61/242,316, filed on Sep. 14, 2009, provisional application No. 61/192,668, filed on Sep. 19, 2008, provisional application No. 61/099,872, filed on Sep. 24, 2008.

(51) Int. Cl.
*G06F 16/2455* (2019.01)
*G06F 12/0888* (2016.01)
*G06F 12/0811* (2016.01)
*G06F 12/0866* (2016.01)

(52) U.S. Cl.
CPC .... *G06F 16/24557* (2019.01); *G06F 12/0811* (2013.01); *G06F 12/0866* (2013.01)

(56) References Cited

U.S. PATENT DOCUMENTS

| | | | |
|---|---|---|---|
| 5,765,034 A | 6/1998 | Recio | |
| 6,044,367 A | 3/2000 | Wolff | |
| 6,434,544 B1 | 8/2002 | Bakalash | |
| 6,457,105 B1 | 9/2002 | Spencer et al. | |
| 6,526,483 B1 | 2/2003 | Cho et al. | |
| 6,683,873 B1* | 1/2004 | Kwok | H04L 29/06 370/389 |
| 6,728,823 B1 | 4/2004 | Walker et al. | |
| 6,823,377 B1* | 11/2004 | Wu | H04L 67/2842 709/223 |
| 6,886,084 B2 | 4/2005 | Kawashima et al. | |
| 6,922,754 B2* | 7/2005 | Liu et al. | 711/138 |
| 6,928,451 B2 | 8/2005 | Mogi et al. | |
| 7,036,147 B1 | 4/2006 | Hursey | |
| 7,069,324 B1* | 6/2006 | Tiwana | G06F 12/0806 709/215 |
| 7,093,162 B2 | 8/2006 | Barga et al. | |
| 7,159,076 B2* | 1/2007 | Madter | 711/118 |
| 7,165,144 B2* | 1/2007 | Choubal et al. | 711/118 |
| 7,228,354 B2 | 6/2007 | Chambliss et al. | |
| 7,237,027 B1 | 6/2007 | Raccah et al. | |
| 7,290,090 B2* | 10/2007 | Madter | 711/118 |
| 7,461,147 B1* | 12/2008 | Mowat et al. | 709/225 |
| 7,506,103 B2* | 3/2009 | Madter | 711/118 |
| 7,636,814 B1 | 12/2009 | Karr et al. | |
| 7,660,945 B1* | 2/2010 | Lee | G06F 12/0804 711/113 |
| 7,769,802 B2 | 8/2010 | Smith | |
| 7,836,262 B2 | 11/2010 | Gunna et al. | |
| 7,904,562 B2* | 3/2011 | Takase et al. | 709/226 |
| 8,244,984 B1 | 8/2012 | Glasco et al. | |
| 8,327,080 B1 | 12/2012 | Der | |
| 8,359,429 B1 | 1/2013 | Sharma et al. | |
| 8,370,452 B2 | 2/2013 | Harvell et al. | |
| 8,683,139 B2* | 3/2014 | Gaither | G06F 12/0888 711/138 |
| 9,003,159 B2 | 4/2015 | Deshkar | |
| 9,256,542 B1* | 2/2016 | Flower | G06F 12/0866 |
| 2002/0143755 A1 | 10/2002 | Wynblatt et al. | |
| 2003/0115324 A1* | 6/2003 | Blumenau | G06F 9/468 709/225 |
| 2004/0003087 A1 | 1/2004 | Chambliss et al. | |
| 2004/0054860 A1* | 3/2004 | Dixit | G06F 12/0888 711/160 |
| 2004/0062106 A1 | 4/2004 | Ramesh et al. | |
| 2004/0117441 A1* | 6/2004 | Liu et al. | 709/203 |
| 2004/0148486 A1 | 7/2004 | Burton | |
| 2004/0215626 A1 | 10/2004 | Colossi et al. | |
| 2004/0225845 A1 | 11/2004 | Kruckemyer et al. | |
| 2004/0230753 A1* | 11/2004 | Amiri | G06F 9/5016 711/147 |
| 2004/0254943 A1 | 12/2004 | Malcolm | |
| 2005/0056520 A1 | 3/2005 | Seagle et al. | |
| 2005/0120025 A1 | 6/2005 | Rodriguez et al. | |
| 2005/0160224 A1 | 7/2005 | Cuomo et al. | |
| 2005/0193160 A1 | 9/2005 | Bhatt et al. | |
| 2005/0210202 A1* | 9/2005 | Choubal et al. | 711/138 |
| 2005/0283637 A1 | 12/2005 | Coldicott et al. | |
| 2006/0106890 A1 | 5/2006 | Paul et al. | |
| 2006/0209444 A1 | 9/2006 | Song | |
| 2006/0218123 A1 | 9/2006 | Chowdhuri et al. | |
| 2006/0224451 A1 | 10/2006 | Kerschbrock et al. | |
| 2006/0224551 A1 | 10/2006 | Lariba-Pey et al. | |
| 2006/0271605 A1 | 11/2006 | Petruzzo | |
| 2006/0271740 A1* | 11/2006 | Mark | G06F 3/0611 711/137 |
| 2006/0277439 A1 | 12/2006 | Davia et al. | |
| 2007/0067575 A1 | 3/2007 | Morris et al. | |
| 2007/0124415 A1 | 5/2007 | Lev-Ran et al. | |
| 2007/0220348 A1 | 9/2007 | Mendoza et al. | |
| 2007/0260819 A1* | 11/2007 | Gao et al. | 711/138 |
| 2007/0271570 A1 | 11/2007 | Brown et al. | |
| 2008/0016283 A1* | 1/2008 | Madter | 711/138 |
| 2008/0046736 A1* | 2/2008 | Arimilli et al. | 713/176 |
| 2008/0104283 A1 | 5/2008 | Shin et al. | |
| 2008/0104329 A1* | 5/2008 | Gaither | G06F 12/0888 711/138 |
| 2008/0147599 A1 | 6/2008 | Young-Lai | |
| 2008/0155229 A1 | 6/2008 | Beyer et al. | |
| 2008/0177803 A1 | 7/2008 | Fineberg et al. | |
| 2008/0244184 A1 | 10/2008 | Lewis et al. | |
| 2008/0244209 A1 | 10/2008 | Seelam et al. | |
| 2008/0307266 A1 | 12/2008 | Chandrasekaran | |
| 2009/0164536 A1 | 6/2009 | Nasre et al. | |
| 2009/0182960 A1 | 7/2009 | Crockett | |
| 2009/0193189 A1 | 7/2009 | Carswell et al. | |
| 2009/0210445 A1 | 8/2009 | Draese | |
| 2009/0248871 A1* | 10/2009 | Takase et al. | 709/226 |
| 2010/0017556 A1 | 1/2010 | Chin et al. | |
| 2010/0077107 A1 | 3/2010 | Lee et al. | |
| 2010/0082648 A1 | 4/2010 | Potapov et al. | |
| 2010/0158486 A1 | 6/2010 | Moon | |
| 2010/0199042 A1 | 8/2010 | Bates | |
| 2010/0205367 A1 | 8/2010 | Ehrlich | |
| 2010/0274962 A1 | 10/2010 | Mosek | |
| 2010/0332901 A1 | 12/2010 | Nussbaum et al. | |
| 2011/0022801 A1 | 1/2011 | Flynn | |
| 2011/0040861 A1* | 2/2011 | Van der Merwe | H04L 29/08729 709/223 |
| 2011/0047084 A1 | 2/2011 | Manzalini et al. | |
| 2011/0066791 A1 | 3/2011 | Goyal | |
| 2011/0153719 A1* | 6/2011 | Santoro | H04L 29/12066 709/203 |
| 2011/0153941 A1* | 6/2011 | Spatscheck | G06F 9/5083 711/119 |
| 2011/0173325 A1 | 7/2011 | Cherian et al. | |
| 2011/0191543 A1 | 8/2011 | Craske et al. | |
| 2011/0238899 A1 | 9/2011 | Yano | |
| 2011/0320804 A1 | 12/2011 | Chan et al. | |
| 2012/0144234 A1 | 6/2012 | Clark et al. | |
| 2012/0159480 A1 | 6/2012 | Matsuzawa | |
| 2013/0086330 A1 | 4/2013 | Baddepudi et al. | |
| 2013/0159627 A1 | 6/2013 | Shea | |

(56) References Cited

U.S. PATENT DOCUMENTS

| | | | |
|---|---|---|---|
| 2013/0262697 A1* | 10/2013 | Karasaridis | H04L 67/2847 709/242 |
| 2013/0275402 A1 | 10/2013 | Zhou et al. | |
| 2013/0318195 A1* | 11/2013 | Kwapniewski | H04L 29/12066 709/213 |
| 2013/0326152 A1 | 12/2013 | Loaiza et al. | |
| 2014/0089565 A1 | 3/2014 | Lee | |
| 2014/0149638 A1 | 5/2014 | Jain | |
| 2014/0281167 A1 | 9/2014 | Danilak | |
| 2014/0281212 A1 | 9/2014 | Schreter | |
| 2014/0281272 A1 | 9/2014 | Loaiza et al. | |
| 2014/0337314 A1 | 11/2014 | Potapov et al. | |
| 2014/0359050 A1 | 12/2014 | Butt | |
| 2014/0359222 A1 | 12/2014 | Zachariassen | |
| 2015/0006813 A1 | 1/2015 | Goyal et al. | |
| 2015/0012690 A1 | 1/2015 | Bruce | |
| 2015/0088805 A1 | 3/2015 | Kakarla et al. | |
| 2015/0089121 A1 | 3/2015 | Coudhury et al. | |
| 2019/0132246 A1* | 5/2019 | Kumar | H04L 47/12 |

FOREIGN PATENT DOCUMENTS

| | | |
|---|---|---|
| JP | 2002-278704 A | 9/2002 |
| JP | 2003-150419 A | 5/2003 |
| JP | 2004-038758 A | 2/2004 |
| WO | WO 93/18461 | 9/1993 |

OTHER PUBLICATIONS

O'Neil, P., et al., "Multi-table joins through bitmapped join indices", SIGMOD Record, ACM, New York, NY, US, vol. 24, No. 3, Sep. 1, 1995, pp. 8-11, ISSN: 0163-5808.

Mackert, F. Lothar et al., "R* optimizer validation and performance evaluation for local queries" SIGMOD Record, ACM, New York, NY, US., vol. 15, No. 2, Jun. 1, 1986, pp. 84-95, ISSN: 0163-5808.

Zhe, Li, et al., "PERF join: an alternative to two-way semijoin and Bloomjoin" Proceedings of the 1995 ACM CIKM International Conference on Information and Knowledge Management ACM New York. NY, US., 1995, pp. 187-144, ISBN: 0-89791-812-6.

Loizos, M., et al., "Improving distributed join efficiency with extended bloom filter operations", Advanced Networking and Applications, 2007. AINA '07., 21st International Conference on IEEE, PI, May 1, 2007, pp. 187-194, ISBN: 978-0-7695-2846-5.

PCT/US2009/057590 International Search Report & Written Opinion dated Feb. 11, 2010, 16 pages.

IBM TDB, "A Scheduling Algorithm for Processing Mutually Exclusive Workloads in a multi-system Configuration", *ip.com* dated Aug. 19, 2002 (3 pages).

U.S. Appl. No. 12/562,984, filed Sep. 18, 2009, Final Office Action, dated Aug. 23, 2012.

U.S. Appl. No. 13/418,150, filed Mar. 12, 2012, Office Action, dated Sep. 12, 2012.

U.S. Appl. No. 12/885,323, filed Sep. 17, 2010, Office Action, dated Sep. 25, 2012.

U.S. Appl. No. 13/288,785, filed Nov. 3, 2011, Final Office Action, dated Jan. 5, 2015.

U.S. Appl. No. 13/971,158, filed Aug. 20, 2013 Office Action, dated Dec. 9, 2013.

U.S. Appl. No. 12/631,985, filed Dec. 7, 2009 Office Action, dated Jan. 14, 2014.

U.S. Appl. No. 13/485,557, filed May 31, 2012, Office Action, dated Mar. 5, 2014.

U.S. Appl. No. 13/449,192, filed Apr. 17, 2012, Final Office Action, dated Feb. 28, 2014.

U.S. Appl. No. 13/288,785, filed Nov. 3, 2011, Office Action, dated Mar. 31, 2014.

U.S. Appl. No. 13/418,150, filed Mar. 12, 2012, Notice of Allowance, dated Apr. 4, 2013.

U.S. Appl. No. 12/631,985, filed Dec. 7, 2009, Office Action, dated May 13, 2013.

U.S. Appl. No. 13/971,158, filed Aug. 20, 2013, Notice of Allowance, dated Jun. 19, 2014.

U.S. Appl. No. 13/449,192, filed Apr. 17, 2012, Advisory Action, dated Apr. 29, 2014.

U.S. Appl. No. 12/631,985, filed Dec. 7, 2009, Notice of Allowance, dated Jun. 9, 2014.

Loizos et al., "Improving Join Efficiency with Extended Bloom Filter Operations", AMC, 2007, 8 pages.

U.S. Appl. No. 12/562,984, filed Sep. 18, 2009, Office Action, dated Jun. 18, 2013.

U.S. Appl. No. 14/339,412, filed Jul. 23, 2014, Final Office Action, dated Jul. 14, 2015.

U.S. Appl. No. 13/485,557, filed May 31, 2012, Final Office Action, dated Sep. 22, 2014.

U.S. Appl. No. 13/449,192, filed Apr. 17, 2012, Notice of Allowance, dated Sep. 11, 2014.

U.S. Appl. No. 12/631,985, filed Dec. 7, 2009, Final Office Action, dated Sep. 23, 2013.

U.S. Appl. No. 13/449,192, filed Apr. 17, 2012, Office Action, dated Oct. 30, 2013.

U.S. Appl. No. 12/562,984, filed Sep. 18, 2009, Final Office Action, dated Nov. 20, 2013.

U.S. Appl. No. 14/487,358, filed Sep. 16, 2014, Advisory Action, dated Nov. 25, 2015.

U.S. Appl. No. 13/839,251, filed Mar. 15, 2013, Advisory Action, dated Jan. 5, 2016.

U.S. Appl. No. 14/487,358, filed Sep. 16, 2014, Notice of Allowance, dated Mar. 29, 2016.

U.S. Appl. No. 14/339,412, filed Jul. 23, 2014, Notice of Allowance, dated Mar. 10, 2016.

U.S. Appl. No. 13/839,251, filed Mar. 15, 2013, Supplemental Notice of Allowance, dated Feb. 29, 2016.

U.S. Appl. No. 13/839,251, filed Mar. 15, 2013, Notice of Allowance, dated Feb. 4, 2016.

U.S. Appl. No. 13/288,785, filed Nov. 3, 2011, Final Office Action, dated May 6, 2016.

U.S. Appl. No. 13/801,319, filed Mar. 13, 2013, Final Office Action, dated Aug. 30, 2016.

Baddepudi, U.S. Appl. No. 13/288,785, filed Nov. 3, 2011, Advisory Action, dated Dec. 29, 2017.

Kakarla, U.S. Appl. No. 14/489,221, filed Sep. 17, 2014, Notice of Allowance, dated Oct. 25, 2018.

Coudhury, U.S. Appl. No. 14/229,809, filed Mar. 28, 2014, Notice of Allowance, dated Jun. 22, 2017.

Coudhury, U.S. Appl. No. 14/229,809, filed Mar. 28, 2014, Final Office Action, dated Apr. 12, 2017.

Kakarla, U.S. Appl. No. 14/489,221, filed Sep. 17, 2014, Office Action, dated May 29, 2018.

Kakarla, U.S. Appl. No. 14/489,221, filed Sep. 17, 2014, Interview Summary, dated Nov. 9, 2017.

Kakarla, U.S. Appl. No. 14/489,221, filed Sep. 17, 2014, Final Office Action, dated Aug. 25, 2017.

Kakarala, U.S. Appl. No. 14/489,221, filed Sep. 17, 2014, Office Action, dated Apr. 6, 2017.

Baddepudi, U.S. Appl. No. 13/288,785, filed Nov. 3, 2011, Final Office Action, dated Sep. 8, 2017.

Loaiza, U.S. Appl. No. 13/801,319, filed Mar. 13, 2013, Office Action, dated Jan. 23, 2019.

* cited by examiner

SELECTIVELY READING DATA FROM CACHE AND PRIMARY STORAGE BASED ON WHETHER CACHE IS OVERLOADED

CROSS-REFERENCE TO RELATED APPLICATIONS; BENEFIT CLAIM

This application claims benefit under 35 U.S.C. § 119(e) of Provisional Application 61/250,384, entitled "Scans Utilizing Flash Cache And Disk Both At The Same Time", filed Oct. 9, 2009.

This application also claims benefit under 35 U.S.C. § 119(e) of Provisional Application 61/242,316, entitled "Caching Data Between A Database Server And A Storage System", filed Sep. 14, 2009.

This application also claims benefit under 35 U.S.C. § 120 as a Continuation-in-part of application Ser. No. 12/631,985 entitled "Caching Data Between A Database Server And A Storage System", filed Dec. 7, 2009, which in turn claims benefit under 35 U.S.C. § 119(e) of Provisional Application 61/242,316, filed Sep. 14, 2009.

This application also claims benefit under 35 U.S.C. § 120 as a Continuation-in-part of application Ser. No. 12/563,073, entitled "Storage-Side Storage Request Management", filed Sep. 18, 2009, which in turn claims benefit under 35 U.S.C. § 119(e) of Provisional Application 61/192,668, filed Sep. 19, 2008 and benefit under 35 U.S.C. § 119(e) of Provisional Application 61/099,872, filed Sep. 24, 2008.

This application also claims benefit under 35 U.S.C. § 120 as a Continuation-in-part of application Ser. No. 12/562,984, entitled "Hash Join Using Collaborative Parallel Filtering In Intelligent Storage With Offloaded Bloom Filters", filed Sep. 18, 2009, which in turn claims benefit under 35 U.S.C. § 119(e) of Provisional Application 61/192,668, filed Sep. 19, 2008, and benefit under 35 U.S.C. § 119(e) of Provisional Application 61/099,872, filed Sep. 24, 2008.

The entire contents of each of the above-listed applications are hereby incorporated by reference as if fully set forth herein.

The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to caching data and, more specifically, to selectively reading data from cache and primary storage.

BACKGROUND

Many software applications, including database servers, read items from and write items to persistent storage. The types of items that are read and written vary based on the nature of the software application. For example, a database server may read and write data blocks, while a spreadsheet may read and write spreadsheet files. Each of the items used by such software applications typically has a primary copy that is stored on the persistent storage, such as a magnetic disk. The storage mechanism on which the primary copies of items are stored is referred to as "primary storage".

At any given time, there may also exist one or more temporary copies of the items. For example, when an item is read or updated by the software application, a temporary copy of the item must be loaded into the volatile memory in which the software application is executing (the "local memory" of the software application). Updates are applied to the temporary copy in the local memory. For the updates to be permanent, the temporarily copy must eventually be written back to the primary storage.

To improve the performance of software applications that read items from and write items to persistent storage, temporary copies of the items may be stored in a storage mechanism that provides faster access than the primary storage. Storage that is used to hold temporary copies of items in order to decrease the time required to access the items is referred to as a "cache".

Typically, caches are smaller but faster than primary storage. For example, if the primary storage is a magnetic disk, then temporary copies of the items may be stored on a smaller faster magnetic disk, a flash drive, a volatile memory, etc. One system that uses an intermediate cache to store items as the items are transferred between local memory and primary storage is described in U.S. patent application Ser. No. 12/631,985.

In a typical system that uses an intermediate cache, the intermediate cache is searched whenever the software application needs a copy of an item that does not reside in local memory. If a copy of the item is present in the intermediate cache, then the copy is provided from the intermediate cache. The item is only retrieved from its primary storage if no copy of the item is present in the intermediate cache.

Unfortunately, even though the storage mechanism that is used as an intermediate cache is generally faster than the storage mechanism used for primary storage, there may be circumstances in which retrieving data from an intermediate cache rather than the primary storage is undesirable. Thus, techniques are described hereafter for intelligently handling requests for items in a system that employs an intermediate cache.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described hereafter for using an intermediate cache to cache items that are transferred between (a) the local memory of a software application and (b) primary storage provided by a storage system. The intermediate cache is managed by the storage system, and may be used in conjunction with one or more additional caches. For example, in one embodiment, the system includes a local-memory cache, an application-side intermediate cache, and a storage-side intermediate cache.

According to one embodiment, the intermediate cache is larger, slower, and less expensive than the local memory used by the software application, but smaller, faster, and more expensive than the non-volatile storage that is used as the primary storage. For example, in one embodiment, the local memory is DRAM, the intermediate cache is FLASH memory, and the storage system uses magnetic disks to persistently store the items managed by the software application. However, this is merely one example of the types of memory devices that may be used to implement a database system according to an embodiment of the invention. Thus, the system may alternatively use DRAM for the local memory, a smaller higher-speed magnetic disk for the intermediate cache, and larger lower-speed magnetic disks to persistently store the data.

The Intermediate Cache

Figure 1:
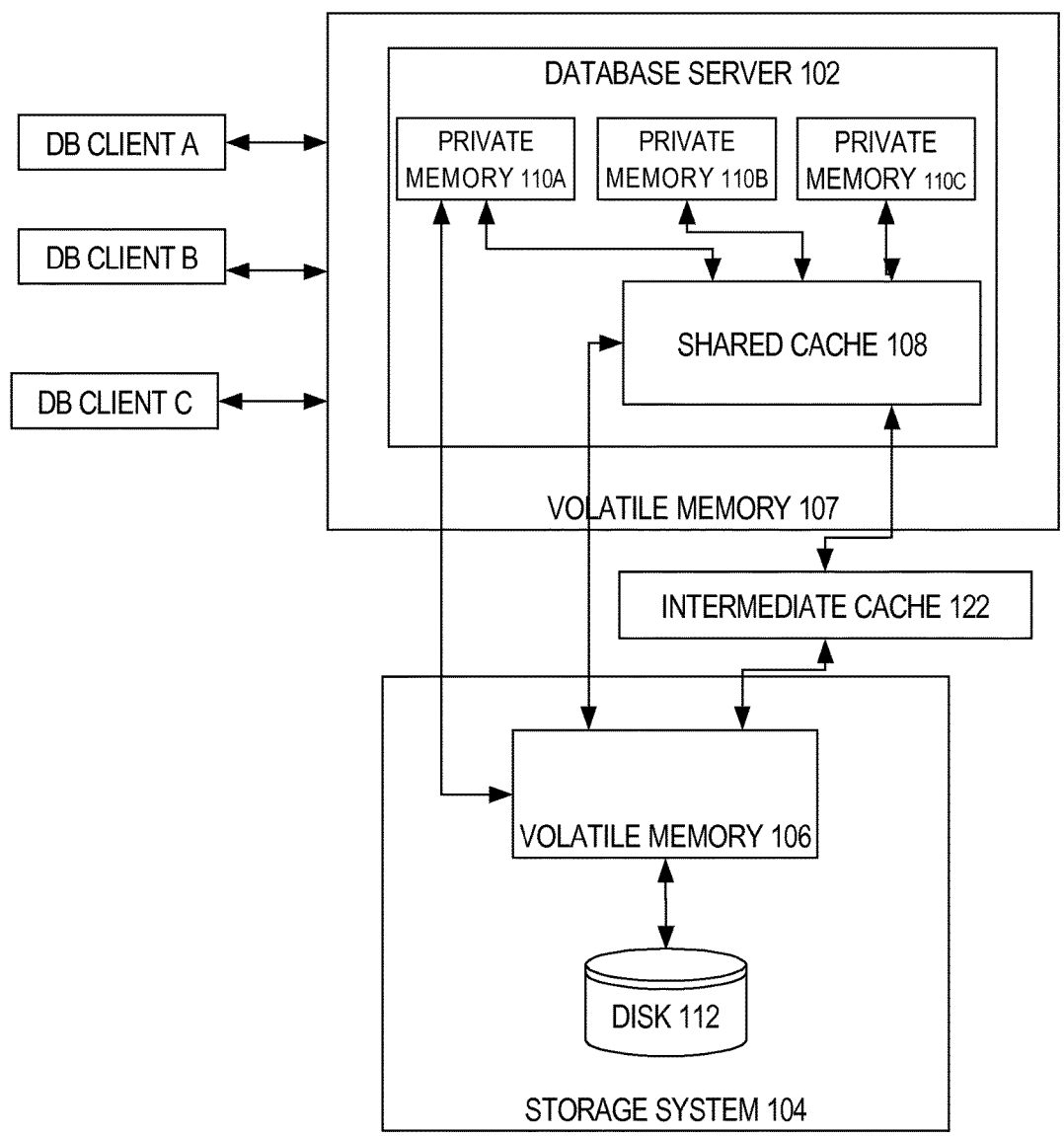
FIG. 1 is a block diagram of a database system that employs an intermediate cache between the local memory used by the software application and the non-volatile storage used by the storage system, according to an embodiment of the invention.

As mentioned above, the techniques described herein involve making use of an intermediate cache that is logically positioned between the local memory of a software application and the primary storage on which the items used by the software application are stored. FIG. 1 is a block diagram of a system that makes use of an intermediate cache 122. In the embodiment illustrated in FIG. 1, the software application 102 is a database server. However, as mentioned above, the techniques described herein may be used in conjunction with any software application that reads items from and writes items to a persistent storage.

The nature of the intermediate cache 122 is such that software application 102 can retrieve items from the intermediate cache 122 faster than the software application 102 can retrieve items from disk 112, which serves as the primary storage for the items. For example, intermediate cache 122 may be implemented using FLASH memory, or a relatively fast magnetic disk.

Referring to FIG. 1, multiple clients (DB client A, DB client B and DB client C) issue commands to database server 102. Database server 102 resides in the local memory 107 of a computing device. That same volatile memory is typically used for both a buffer cache (shown as shared cache 108), and for private memory 110A-110C. Private memory 110A-110C differs from shared cache 108 in that all DB clients A-C are allowed to read items that reside in shared cache 108, but only the DB client A-C that corresponds to a particular private memory 110A-C is allowed to see items that reside in that private memory 110A-C. In the illustrated example, private memory 110A is used for operations requested by DB client A, private memory 110B is used for operations requested by DB client B, and private memory 110C is used for operations requested by DB client C.

Typically, when a database client requests to read an item that does not currently reside in local memory 107, database server 102 sends a request for the item to the storage system 104. Without intermediate cache 122, storage system 104 would respond to the request by reading the item from primary storage (such as disk 112), and sending the item to the database server 102. As data is written to or retrieved from disk 112, the data is temporarily stored in local memory 106 within storage system 104.

When the database server 102 receives the item from storage system 104, database server 102 stores the item in shared cache 108. If shared cache 108 is currently full, then the database server 102 first makes room for the new item by selecting an existing item for replacement. If the item that is selected for replacement is "dirty", then the item must be sent to the storage system 104 before replacing the item within the shared cache 108. A dirty item is an item that has been updated after its retrieval from the storage system 104, so that the version of the item that resides in shared cache 108 differs from and is more recent than the version of the item that resides in the storage system 104.

According to one embodiment, copies of items are not automatically stored in intermediate cache 122 in response to those items being retrieved from the disk 112. Rather, in one embodiment, no items are stored in intermediate cache 122 at the time that they are retrieved from disk 112. Instead, items are stored in intermediate cache 122 only in response to those items being replaced in shared cache 108. Thus, intermediate cache 122 is used as an "overflow" area of shared cache 108.

Further, caching policies are employed that treat items differently based on factors such as the database object to which the items belong, the item type of the item, a characteristic of the items, and the database operation in which the items are involved. Once cached, these same factors may be used to determine the conditions under which the items are replaced within the cache to make room for new items. For example, the caching policy may indicate that items from some tables may be replaced under one set of conditions, while items from other tables may be replaced under a different set of conditions.

Usage Example

As an example of how intermediate cache 122 operates as an overflow area for shared cache 108, assume that an item A is needed for an operation that was requested by DB client A. To retrieve a copy of item A, the software application first checks shared cache 108 for item A. If shared cache 108 does not have item A, then intermediate cache 122 will be checked for item A. If intermediate cache 122 does not have item A, then item A is retrieved from one of disk 112. The retrieved copy of item A is placed in shared cache 108. However, if shared cache 108 is full, then an item in shared cache 108 is replaced with item A.

For the purpose of explanation, assume that software application 102 determines that an item B that resides in shared cache 108 should be replaced with item A. In response to item B being replaced in shared cache 108, item B is written to intermediate cache 122.

If item B is "dirty" at the time item B is replaced within shared cache 108, item B is written to disk 112 before item B is written to intermediate cache 122. Because dirty items are written to disk 112 before they are placed into intermediate cache 122, the items in intermediate cache 122 will be the same versions as the copies that are on disk 112. Thus, the items that are stored in the intermediate cache 122 are "clean".

If the intermediate cache 122 is full, writing item B to intermediate cache 122 involves replacing an item C that currently resides in intermediate cache 122. However, replacing item C in the intermediate cache 122 does not require writing item C back to disk 112, because all of the items (including item C) that are stored in the intermediate cache 122 are clean.

After item B has been written to intermediate cache 122 (and to disk 112, if item B was dirty), the software application 102 may be asked to perform an operation that involves item B. After determining that item B does not reside in shared cache 108, intermediate cache 122 is searched for item B. Under these circumstances, the copy of item B will reside in intermediate cache 122. Consequently, the software application 102 avoids the overhead associated with retrieving item B from disk 112 by retrieving item B directly from intermediate cache 122 into shared cache 108.

Caching Policies

In the example given above, when item B was replaced in local memory, item B was written to intermediate cache 122. However, according to one embodiment, items are not always written to intermediate cache 122 when they are replaced in shared cache 108. Rather, items are written to intermediate cache 122 only when they satisfy certain caching policies. The caching policies that govern intermediate cache 122 may take many forms. For example, the decision about whether to store an item into the intermediate cache may hinge on (a) the database object to which the item belongs, (b) the nature of the database operation in which the item was involved, (c) the item type of the item, and/or (d) an attribute of the item. These are merely examples of the types of factors that may be used to determine whether or not an item is to be cached in the intermediate cache. While examples of how each of these factors may be used by the caching policies that govern the intermediate cache 122, these factors are merely exemplary. The caching policies that apply to intermediate cache 122 are not limited to any particular factors.

The Keep Directive

As mentioned above, the policies that govern intermediate cache 122 may include policies that take into account the database objects to which items belong. For example, according to one embodiment, software application 102 is configured to receive certain directives from users. In one embodiment, the directives include a KEEP directive by which users designate which objects within the database are "KEEP" objects. Items from KEEP objects are referred to herein as KEEP items.

Various mechanisms may be used to designate objects as KEEP objects. For example, in one embodiment, the database command that is submitted to create a database object may include a parameter value that indicates whether the object is a KEEP object. As another example, after an object has been created, a user may submit an ALTER command that changes a property of the object from non-KEEP to KEEP. The user may be motivated to do so, for example, by statistics that indicate that the object is accessed more frequently than other objects. There is no restriction on the type of objects that may be designated as KEEP objects. For example, KEEP objects may be tables, indexes, partitions of tables, tablespaces, etc.

As shall be explained hereafter, KEEP items receive preferential treatment once the KEEP items are stored in intermediate cache 122. Specifically, in one embodiment, once stored in intermediate cache 122, KEEP items are not replaced within intermediate cache 122 as long as there are non-KEEP items that can be replaced. For example, assume that a table X has been designated as a KEEP object, and that other tables Y and Z are non-KEEP objects. Further assume that intermediate cache 122 is full of items from tables X, Y and Z. Under these circumstances, if any new item needs to be placed in intermediate cache 122, then the new item would replace either a non-KEEP item from table Y, or a non-KEEP item from table Z. Items within intermediate cache 122 that belong to table X would not be considered as candidates for replacement, regardless of how long it has been since the items have been accessed.

To select which non-KEEP item to replace with the new item, any one of a variety of replacement policies may be used For example, the non-KEEP item that is replaced by the new item may be selected using a least recently used replacement policy, or a least frequently used policy.

In an alternative embodiment, a new item is allowed to replace a KEEP item within intermediate cache 122 under certain circumstances. In one embodiment that allows KEEP items to fill the entire intermediate cache 122, a new item is allowed to replace a KEEP item when the new item is a KEEP item and the entire intermediate cache is full of KEEP items. In an embodiment that shall be described hereafter, KEEP items are not allowed to fill the entire intermediate cache 122. In an embodiment that does not allow KEEP items to fill the entire intermediate cache 122, a new item is also allowed to replace a KEEP item when the new item is a KEEP item and the amount of intermediate cache 122 that is currently used by KEEP items has reached a predetermined maximum size.

Reserved and Unreserved Areas

According to one embodiment, the intermediate cache 122 is divided into two areas: a reserved area and an unreserved area. The reserved area is dedicated to storing KEEP items. The unreserved area stores non-KEEP items.

In one embodiment, the reserved area and the unreserved area have fixed sizes. For example, intermediate cache 122 may be a 100 gigabyte FLASH disk, where 70 gigabytes are used as the reserved area, and 30 gigabytes are used as the unreserved area. In this scenario, KEEP items are likely to remain in the intermediate cache 122 longer than non-keep items merely by virtue of the fact that there may be fewer KEEP items than non-KEEP items, and more storage within the FLASH disk is used to cache the KEEP items.

In an alternative embodiment, the sizes of the reserved and unreserved areas change dynamically based on the items that are stored in the intermediate cache 122. For example, in one embodiment, the unreserved area is initially established to include 100% of the intermediate cache 122. The unreserved area continues to include 100% of the intermediate cache until a KEEP item is stored in the intermediate cache 122. As KEEP items are stored in the intermediate cache 122, the size of the reserved area of the intermediate cache 122 automatically increases to accommodate the KEEP items. As the size of the reserved area increases, the size of the unreserved area decreases. For example, storing a 2 kilobyte KEEP item within in intermediate cache 122 increases the size of the reserved area by 2 kilobytes, and reduces the size of the unreserved area by 2 kilobytes.

If the size of the reserved area is allowed to increase unchecked, the reserved area may ultimately consume the entire intermediate cache 122. Once the reserved area has taken over the entire intermediate cache 122, the intermediate cache 122 will cease to cache any non-KEEP items. To avoid this situation, in one embodiment, a maximum size is established for the reserved area. In such an embodiment, the reserved area is allowed to expand until the reserved area has reached its maximum size. At that point, if additional KEEP items need to be stored in the intermediate cache 122, the new KEEP items are stored in the reserved area over other KEEP items, thereby avoiding the need to further extend the reserved area. When a new KEEP item needs to be stored over an existing KEEP item, the KEEP item that is replaced may be selected using any one of a variety of replacement policies. For example, in one embodiment, the KEEP item that is written over is selected using a least recently used replacement policy.

The None Directive

In one embodiment, a NONE directive may be used to indicate that items from a particular object should not be placed in intermediate cache 122. For example, if it is known that items from a particular table are rarely accessed with high frequency, the user may use the NONE directive to indicate that the table is a NONE object. items from NONE objects ("NONE items") are not placed into intermediate cache when they would otherwise have been placed in intermediate cache 122 if they had not been NONE items.

Caching Policies Based on Operation Type

As mentioned above, the caching policies that govern intermediate cache 122 may include policies that take into account the type of database operation that is being performed on the items. According to one embodiment, when the nature of the database operation that causes the software application 102 to retrieve items into local memory 107 is such that it is unlikely that those items will be accessed again in the near future, intermediate cache 122 is not used to cache copies of the items.

For example, when software application 102 performs a scan, there is a relatively low probability that the items that are retrieved during the scan will be needed again soon after completion of the scan. Thus, according to one embodiment, items that are retrieved by software application 102 during performance of a scan are not cached in intermediate cache 122. As used herein, the term "scan" refers to a database access method for retrieving items from database objects, such as tables and indexes. Thus, table scans and index scans are both forms of "scans".

Various mechanisms may be used to ensure that intermediate cache 122 is not used to cache items that are involved in certain types of operations. For example, in one embodiment, caching items in intermediate cache 122 is avoided by causing software application 102 to retrieve those items directly into the private memory of the DB client's for whom the operations are being performed. Because the items are loaded directly into private memory without first being placed in shared cache 108, the items will never be replaced in shared cache 108. In embodiments where the replacement of a dirty item in shared cache 108 is the trigger for storing the item in intermediate cache 122, items never stored in shared cache 108 will also never be stored in intermediate cache 122.

Caching Policies Based on Item Type

As mentioned above, the caching policies that govern intermediate cache 122 may include policies that take into account the item type of items that are being written to disk. For example, a typical software application 102 manages many types of disk blocks. Common block types include: an index block type, a data block type, an undo block type, a segment header block type, a transaction header block type, etc. The block type of a block generally corresponds to what type of information is contained within the block. For example, undo blocks contain information that allows software application 102 to undo changes that are made to other items.

According to one embodiment, when the type of an item is such that it is relatively unlikely that the item will be accessed again in the near future, the item is not stored in intermediate cache 122 in response to the item being written to disk 112. For example, although software application 102 may need to undo changes to items in a variety of circumstances (such as when the transactions that performed the changes abort, or when a non-current version of the items is needed), those circumstances are relatively infrequent. Therefore, according to one embodiment, undo blocks are not stored in intermediate cache 122 in response to being written to disk 112.

Caching Policies Based on Attributes of Items

As mentioned above, the caching policies that govern intermediate cache 122 may include policies that take into account the attributes of items that are being written to disk. The attributes reflect information about the item itself, rather than the type of the content of the item. For example, an attribute of an item may be whether the item is encrypted. In one embodiment, software application 102 supports both encrypted items and non-encrypted items. To reduce the likelihood that encrypted items will be compromised, the caching policy may be that encrypted items are not stored to intermediate cache 122.

As another example, some storage systems support mirroring, where all changes that are made to a "primary" copy of an item are also made to a "secondary" copy of the same item. In such systems, one attribute of an item is whether the item is a primary copy or a secondary copy. According to one embodiment, when an item is a primary copy, the item is stored to intermediate cache 122 in response to the primary copy being written to disk 112. On the other hand, when an item is a secondary copy, the item is not stored to intermediate cache 122 when written to disk 112.

Caching Policies Based on Logical Characteristics of Requests

The caching policies that govern intermediate cache 122 may include policies that take into account one or more logical characteristics of the I/O requests. The logical characteristics may include, for example, the identity of the user for whom the I/O request was submitted, the service that submitted the I/O request, the database targeted by the I/O request, an indication of a consumer group to which the I/O request maps, the reason why the I/O request was issued, a priority category of the I/O request, etc. These and other logical characteristics that may be associated with I/O requests are described in detail in U.S. patent application Ser. No. 12/563,073, entitled "Storage-Side Storage Request Management", filed Sep. 18, 2009, which has been incorporated herein by reference. Such logical characteristics differ fundamentally from the physical characteristics of the I/O requests, such as the storage location of the data targeted by the I/O request and the amount of data involved in the I/O operation specified by the I/O request.

As an example of a caching policy that is based on logical characteristics, assume that disk 112 stores data for two databases DB1 and DB2. Assume that DB1 has been designated a high-priority database, while DB2 has been designated a low priority database. Under these circumstances, storage system 104 may have a policy to cache items from DB1 in intermediate cache 122, and to not cache items from DB2 in intermediate cache 112. Since items from DB2 would never be placed in intermediate cache 122, items from DB2 that do not reside in local memory 106 would always have to be retrieved from their primary storage on disk 112.

As another example, a caching policy may identify a particular user or set of users as priority users. Based on these priority designations, items requested by priority users are allowed to be stored in intermediate cache 122, while items requested by non-priority users are provided from primary storage on disk 112 to the database server 102 without being stored in the intermediate cache 122.

Similarly, consumer groups and/or categories may be divided into priority and non-priority consumer groups and/or categories. Items requested by I/O requests that are not associated with a priority consumer group or category are provided to database server 102 without storing the items in the intermediate cache 122. Conversely, items requested by I/O request that are associated with a priority consumer group and/or category are stored in intermediate cache 122 upon being provided to database server 102.

Load-on-Road and Load-on-Replace

In the embodiments described above, copies of items are stored in intermediate cache 122 in response the items being replaced within shared cache 108. Thus, those embodiments represent a load-on-replace policy for storing items in intermediate cache 122. In alternative embodiment, load-on-read policies govern storage of items in intermediate cache 122.

According to load-on-read policies, items are stored in intermediate cache 122 at the time they are retrieved into local memory 106. Regardless of whether load-on-read or load-on-replace is used, the various caching policies described above may be applied to ensure that less-useful items are not stored in intermediate cache 122, and that the most useful items are stored longer in intermediate cache 122 than other items. Specifically, similar to load-on-replace, an embodiment that uses load-on-read may also employ caching policies that take into account one or more of: the type of database operation in which the items are involved, the database objects to which the items belong, the item type of the items and attributes of the items.

Application-Side Intermediate Cache

Figure 3:
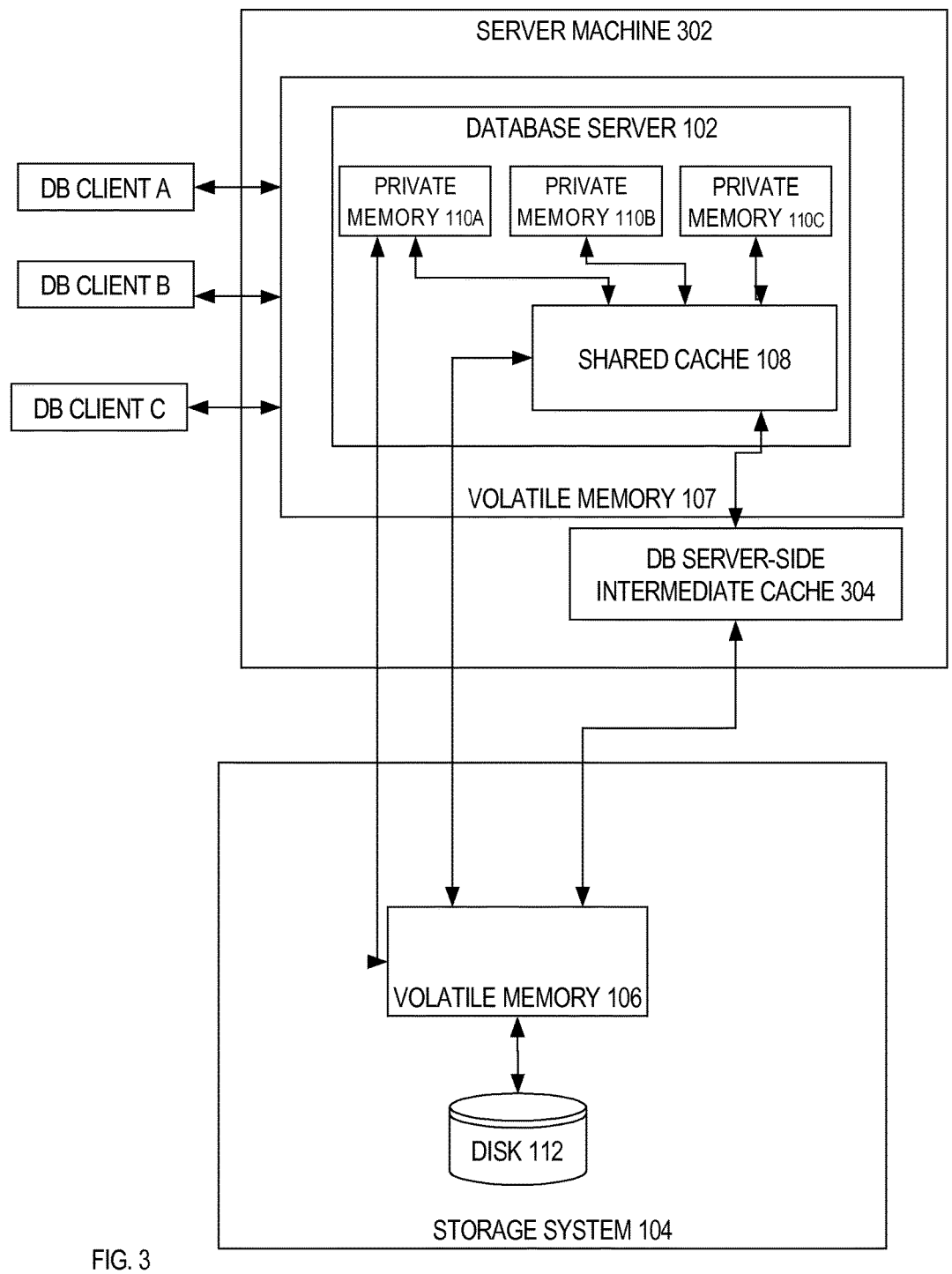
FIG. 3 is a block diagram of a database system in which the intermediate cache is local to the same server machine that is executing the software application, according to an embodiment of the invention.
Figure 4:
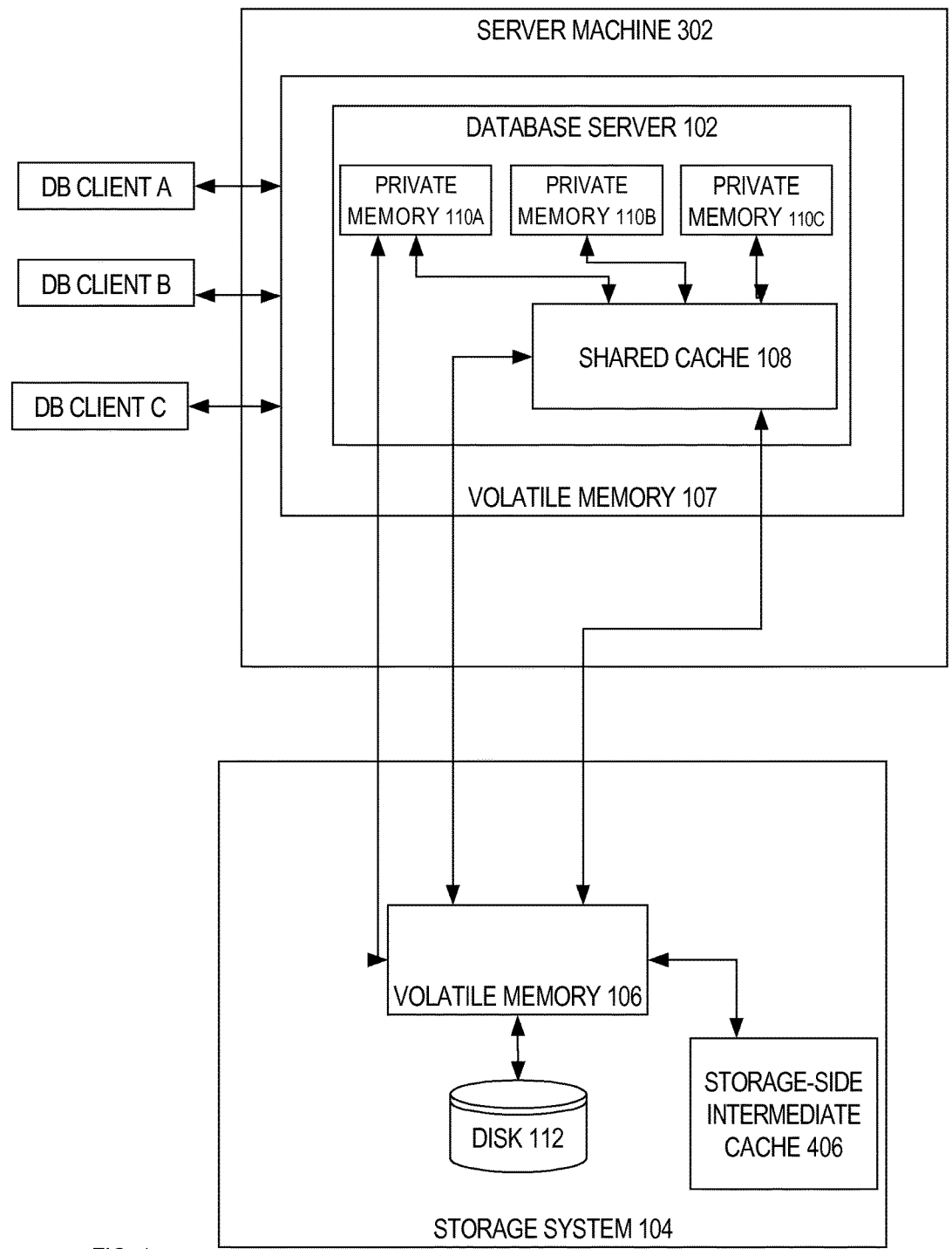
FIG. 4 is a block diagram of a database system in which the intermediate cache resides in a storage system, according to an embodiment of the invention.
Figure 5:
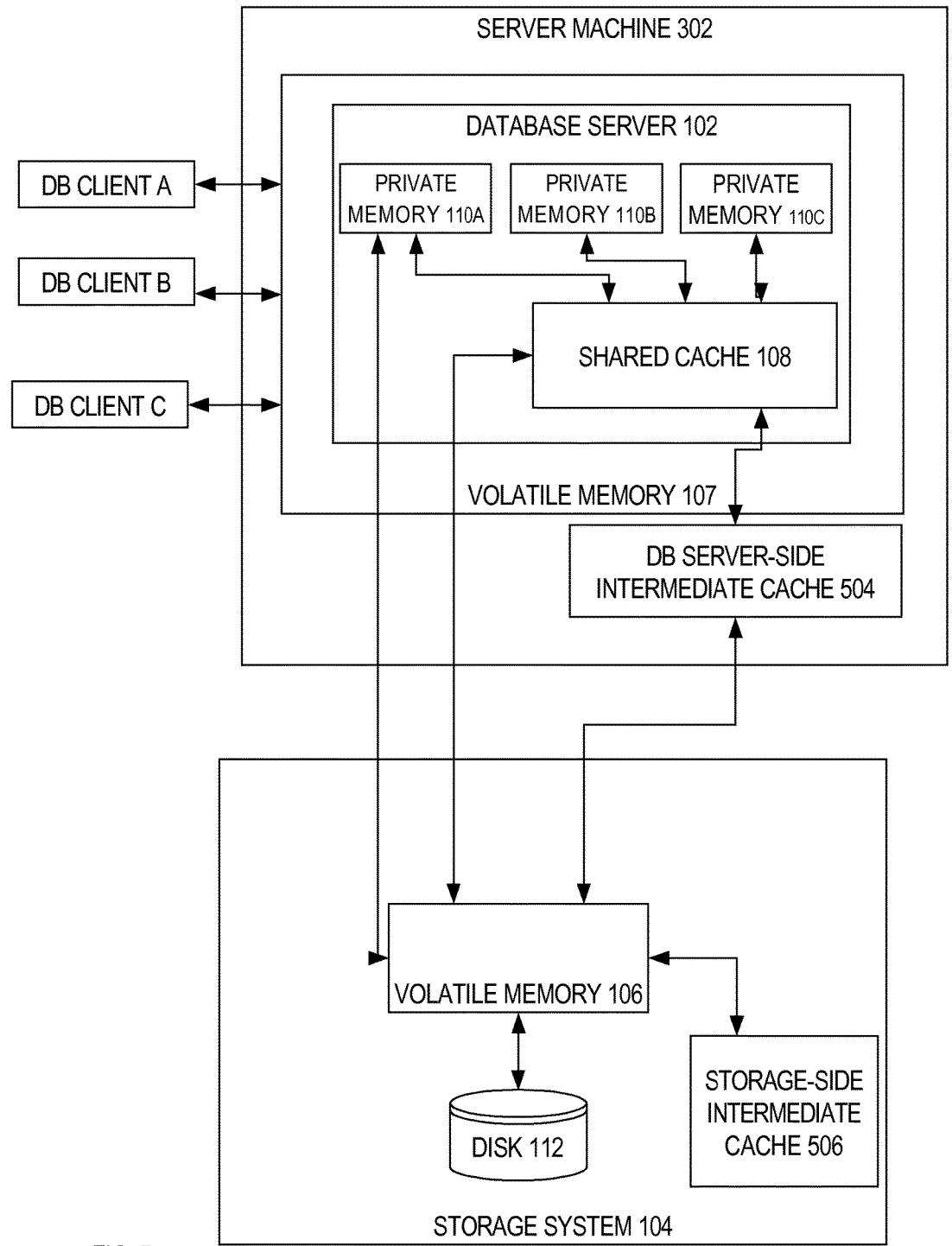
FIG. 5 is a block diagram of a database system that employs both a application-side intermediate cache, and a storage-side intermediate cache, according to an embodiment of the invention.

In FIG. 1, intermediate cache 122 is located between local memory 106 and disk 112. Thus, intermediate cache 122 may be local to the software application, local to the storage system, or deployed separate from both the software application and the storage system. According to one embodiment, the caching policy used by intermediate cache 122 depends on where the intermediate cache 122 is deployed. FIGS. 3, 4 and 5 illustrate in greater detail various configurations of where intermediate cache 122 may be located, according to various embodiments of the invention.

Referring to FIG. 3, it illustrates an embodiment in which intermediate cache 122 is implemented as a application-side cache 304. Application-side cache 304 is local to the server machine 302 on which software application 102 is executing. Consequently, retrieving items from application-side cache 304 do not incur the transmission overhead that would otherwise exist if the intermediate cache 122 were remote to server machine 302.

In some systems, the mirroring of data is handled by the storage system 104 in a manner that is transparent to the software application 102. In such systems, the primary/secondary distinction does not exist outside of the storage system 104. Therefore, when intermediate cache 122 is implemented as a application-side intermediate cache 304, the caching policy does not make use of any primary/secondary distinctions. However, the application-side intermediate cache 304 may still take into account whether the database objects to which items belong are KEEP, non-KEEP or NONE, whether the items are encrypted, whether the items are undo blocks, wither the items are being access as part of a scan, etc.

Storage-Side Intermediate Cache

FIG. 4 is a block diagram of an embodiment in which the intermediate cache 122 is implemented as a storage-side intermediate cache 406 that is local to the storage system 104. Because the storage-side intermediate cache 406 is not local to the server machine 302, retrieving items from storage-side intermediate cache 406 incurs more transmission overhead than would exist if the intermediate cache 122 were local to server machine 302. However, retrieval of items from storage-side intermediate cache 406 is still faster than retrieval of items from disk 112, since storage-side intermediate cache 406 is generally implemented on a faster storage device than disk 112. For example, storage-side intermediate cache 406 may be implemented on a FLASH disk, or on a relatively fast magnetic disk, while disk 112 is implemented by a relatively slow magnetic disk.

According to one embodiment, when intermediate cache 122 is implemented on the storage side, the software application 102 communicates information to storage system 104 to enable storage system 104 to implement intelligent caching policies. For example, when storage system 104 receives an I/O request for an item from disk 112, storage system 104 does not normally know the type of database operation in which the items are involved, the database objects to which the items belong, the item type of the items, nor the attributes of the items. Consequently, for storage system 104 to use caching policies that take into account these factors, software application 102 must provide additional information to storage system 104.

According to one embodiment, the additional information provided by software application 102 to storage system with a particular I/O request may simply be a flag that indicates whether or not storage system 104 should store the item involved in the I/O request in storage-side intermediate cache 406. For example, if the software application 102 is requesting items involved in a scan, the software application 102 may set the flags that accompany the I/O requests to indicate that the items should not be stored in intermediate cache 406. Similarly, software application 102 may set the flags to indicate that items should not be stored in storage-side intermediate cache 406 if: the software application 102 is requesting items that belong to a NONE object, the software application 102 is writing undo blocks, or the software application 102 knows that the I/O involves encrypted information.

In embodiments that support KEEP and non-KEEP items, the software application 102 may include a flag with each I/O request to indicate whether the item involved in the I/O request is a KEEP item or a non-KEEP item. Based on this information, the storage system 104 may maintain reserved and unreserved areas within storage-side intermediate cache 406, as described above.

In an alternative embodiment, rather than merely passing flags, software application 102 passes information that enables storage system 104 to make the decisions relating to the caching policies. For example, software application 102 may pass storage system 104 information that indicates which database objects have been designated as KEEP objects or NONE objects. Then, with each I/O request, software application 102 may pass to storage system 104 information that indicates the database object involved in the I/O request. Based on this information, storage system 104 can make the decision about whether to store the item specified in the I/O request in storage-side intermediate cache 406, and if the item is to be stored, whether to store the item in the reserved area or the unreserved area.

Similarly, software application 102 may pass to storage system 104 information that indicates the item type of the item involved in the I/O request (e.g. whether the item is an undo block) and/or an attribute of the item involved in the I/O request. Based on this information, the storage system 104 may make decisions about whether to store in storage-side intermediate cache 406 the items involved in the I/O requests that it receives.

Load-on-Read-or-Write

In one embodiment, the storage-side intermediate cache 406 employs both load-on-read and load-on-write techniques. Thus, based on the caching policy, storage system 104 may copy items into storage-side intermediate cache 406 both when the items are transferred from disk 112 to server machine 302, and when the items are transferred from server machine 302 to disk 112.

In systems where the storage system 104 performs mirroring, the storage system 104 may implement a caching policy that takes into account the primary/secondary distinction without any additional information from the software application 102. Specifically, because storage system 104 is responsible for maintaining the primary and secondary copies, storage system 104 is aware of which copies are primary and which are secondary. Based on this information, the storage system 104 may implement a policy in which secondary copies of items are always treated as NONE items.

In one embodiment, the policy of treating secondary copies as NONE items has an exception that specifies that a secondary copy of an item is cached in storage-side intermediate cache 406 if involved in a read operation, but not when involved in a write operation. The secondary copy is cached during read operations because the secondary copy is typically read only when the primary copy is unavailable. Thus, when the subject of a read operation, the secondary copy effectively becomes the primary copy, and for the purpose of caching is treated as if the secondary copy were the primary copy.

Multiple-Server Systems

When implemented as a storage-side intermediate cache 406, intermediate cache 122 may benefit many software applications. For example, server machine 302 may be merely one of a plurality of server machines that are running software applications that are accessing data stored on storage devices that are managed by storage system 104. The same storage-side intermediate cache 406 may be used by storage system 104 to improve the performance of the I/O requests for all of those software applications.

Further, when multiple software applications are sharing access to the same database, it is possible that an item loaded into storage-side intermediate cache 406 in response to the request by one software application may be provided from the storage-side intermediate cache 406 to another software application that needs a copy of the same item.

Per-Object Cache-Hit Statistics

One benefit of having software application 102 provide storage system 104 information that identifies the database objects involved in the I/O requests is that this information enables storage system 104 to maintain statistics about I/O requests on a per-database-object basis. Such statistics may indicate that a particular database object is accessed frequently, while another database object is accessed rarely. This information may be helpful to a user who is deciding which database objects should be made KEEP objects and which database objects should be made NONE objects.

In one embodiment, these statistics are used to automatically transition objects between KEEP, non-KEEP, and NONE. For example, in response to determining, based on the per-object statistics, that a particular object is rarely accessed, the object may be automatically transitioned from a KEEP object to a non-KEEP object, or from a non-KEEP object to a NONE object. On the other hand, in response to determining that a particular object is frequently accessed, the object may be automatically transitioned from a NONE object to a non-KEEP object, or from a non-KEEP object to a KEEP object.

Dropped Objects

According to one embodiment, when a database object is dropped, all items that belong to the database object within intermediate cache 122 are invalidated, thereby making space for new objects. When KEEP items are dropped, the size of the reserved area shrinks, so that the memory occupied by the invalidated items can be used for either KEEP or non-KEEP items.

Preferably, the software application 102 sends a message to storage system 104 to inform storage system 104 when a data object has been dropped. In response, the storage system 104 uses the metadata about the database objects to which the cached items belong to identify and invalidate within the storage-side intermediate cache 506 all items that belong to the dropped table.

Cache Expiration

According to one embodiment, items within intermediate cache 122 expire under certain conditions. When an item expires within cache 122, the storage within intermediate cache 122 in which the item resides is freed to allow storage of other items. If the item was a KEEP item, then the reserved area of intermediate cache 122 shrinks, thereby making the space available for either KEEP items or non-KEEP items.

According to one embodiment, cache expiration can occur at both the item level and the object level. For example, the expiration policy that governs intermediate cache 122 may be that (1) if an item has not been accessed in a week, the item expires, and (2) if item belongs to a particular object which has not been accessed in three days, then all items that belong to that object expire. In one embodiment, expiration timers are only set for KEEP items and KEEP objects, because unused non-KEEP items will be replaced simply by using least-recently-used replacement techniques on items in the unreserved area of intermediate cache 122.

Employing a cache expiration policy is particularly useful in embodiments that have a storage-side intermediate cache 406. When a storage-side intermediate cache 406 is involved, it is possible for information to be lost between server machine 302 and storage system 104. For example, assume that a particular KEEP object is dropped by software application 102. If for any reason storage system 104 is not told that the object has been dropped, then the storage-side intermediate cache 406 may continue to store items from the KEEP object indefinitely. An expiration policy ensures that the items that will never be used again will not continue to occupy the storage-side intermediate cache 406.

According to an alternative embodiment, the memory that stores KEEP items and KEEP objects that expire is not invalidated when in response to the expiration. Rather, the memory is logically moved from the reserved area to the unreserved area. As a result of this change, the reserved area shrinks, the unreserved area grows, and the expired KEEP items within the memory may be overwritten by non-KEEP items. If the expired KEEP items are accessed again before being replaced, then the memory is upgraded once again to be part of the reserved area, thereby removing those KEEP items from the unreserved area.

Combining Server-Side and Storage-Side Caches

FIG. 5 is a block diagram that employs both an application-side intermediate cache 504 and a storage-side intermediate cache 506. In one embodiment, application-side intermediate cache 504 is local to and used exclusively by server machine 302, while storage-side intermediate cache 506 is managed by storage system 104 and is used to speed up requests made by many software applications, some of which may not have their own application-side intermediate caches.

In a system that includes both a application-side intermediate cache 504 and a storage-side intermediate cache 506, when software application 102 requires an item, shared cache 108 is first search for the item, and if the item is not in shared cache 108, then application-side intermediate cache 504 is searched for the item. If the item does not exist in either shared cache 108 or application-side intermediate cache 504, then the software application requests the item from storage system 104. Storage system 104 first looks for the item in storage-side intermediate cache 506, and if the item is not in storage-side intermediate cache 506, then storage system 104 retrieves the item from disk 112.

In a system that includes both a application-side intermediate cache 504 and a storage-side intermediate cache 506, the caching policies need not be the same. For example, application-side intermediate cache 504 may allow caching of items retrieved during scans but not allow caching of undo blocks, whereas storage-side intermediate cache 506 may allow caching of undo blocks, but my not allow caching of items retrieved during scans.

Further, even in systems where both application-side intermediate cache 504 and a storage-side intermediate cache 506 allow the use of KEEP and NONE directives, the objects that are marked KEEP and NONE for application-side intermediate cache 504 may be different than the objects that are marked KEEP and NONE for the storage-side intermediate cache 506. For example, the same table T may be marked KEEP for the purpose of application-side caching, and marked non-KEEP for the purpose of storage-side caching. Under these circumstances, items from the object will be stored in the reserved area of DB server side cache 504, and stored in the unreserved area of storage-side intermediate cache 506.

Cache-Copy Metadata

According to one embodiment, metadata is maintained for items that reside in intermediate cache 122. However, in one embodiment, the amount of metadata maintained for items that reside in intermediate cache 122 is significantly smaller than the metadata maintained by software application 102 for items in shared cache 108. For example, in an embodiment that uses a load-on-replace policy, the copies of items in shared cache 108 will never be out of sync with the copies of those same items that are on disk 112. Therefore, the metadata for items in intermediate cache 122 need not include information about whether the items are dirty, and if dirty, when the times were modified.

As another example, in one embodiment the items in intermediate cache 122 are not owned exclusively by any transaction. Consequently, items within intermediate cache 122 need only support minimal lock state to indicate whether the items are subject to a shared lock or to no lock. In response to an item that resides in intermediate cache 122 being loaded into local memory 106, the minimal lock structure required for the item in intermediate cache 122 is converted into a larger lock structure required to support numerous types of locks, dirty items, etc.

Intelligent Handling of Read Requests

When retrieving data in a system that includes a storage-side intermediate cache 406, conventional use of intermediate cache 406 would involve searching shared cache 108 first for the item. If the item is not in shared cache 108, then searching for the item in intermediate cache 406. If the item is not in the intermediate cache 406, then retrieving the item from non-volatile storage 112.

Unfortunately, the conventional use of intermediate cache 406 during read operations does not provide optimal results. Specifically, there are circumstances under which retrieving a copy of an item from the intermediate cache 406 is actually slower than retrieving a copy of the same item from primary storage. This circumstance may occur, for example, if the number of I/O requests that have been issued to the intermediate cache 406 has exceeded the I/O capacity of the intermediate cache 406.

Further, even when it would be faster to read a copy of an item from the intermediate cache 406, it may be better to retrieve the item from the primary storage. For example, issuing a large number of low-priority I/O requests to the intermediate cache 406 may create a backlog that reduces the performance of subsequent high-priority I/O requests that are issued to the intermediate cache 406. Thus, according to one embodiment, low-priority I/O requests are issued to primary storage even though copies of the items that are requested by the low-priority requests reside in the intermediate cache 406.

Direct Reads

Direct reads are reads where the database server 102 does not attempt to directly retrieve requested items from shared cache 108. Instead, database server 102 sends a request for all of the requested items to storage system 104, even though some of those items may be in shared cache 108. To ensure that storage system 104 has the current versions of the items that are requested in a direct read, the database server 102 flushes any dirty versions of the requested items from the shared cache 108 to disk 112 before performing the direct read.

According to one embodiment, database server 102 performs direct reads for large scans. In such an embodiment, when a database operation requires a scan, the database server 102 determines how much data the scan will require. If the amount of data required by the scan exceeds a threshold, then the scan is performed using a direct read. On the other hand, if the amount of data required by the scan does not exceed the threshold, the scan is not performed using a direct read.

Overloading Intermediate Cache

In general, retrieving items from storage-side intermediate cache 406 is faster than retrieving items from disk 112. However, it is possible for so many requests to be issued to storage-side intermediate cache 406 that retrieving items from storage-side intermediate cache 406 actually becomes slower than retrieving the same items from disk 112. When this occurs, storage-side intermediate cache 406 is considered "overloaded".

For example, assume that three tables T1, T2 and T3 are all designated as KEEP objects. Further assume that, over time, a large percentage of the blocks containing T1, T2 and T3 have been loaded into storage-side intermediate cache 406. If, under these conditions, database server 102 offloads scans of each of tables T1, T2 and T3, storage-side intermediate cache 406 may become overloaded.

When cache 406 is overloaded, it is more efficient to retrieve items from primary storage on disk 112 even though the items are cached in storage-side intermediate cache 406. Therefore, according to one embodiment, before attempting to read an item from storage-side intermediate cache 406, storage system 104 determines whether the storage-side intermediate cache 406 is in an overloaded state. If storage-side intermediate cache 406 is in an overloaded state, then storage system 104 reads the item from disk 112.

Various techniques may be used to determine that storage-side intermediate cache 406 is overloaded. For example, in one embodiment, I/O requests that (a) have been issued to storage-side intermediate cache 406, and (b) have not yet been satisfied, are placed in a "pending I/O queue". Through testing, it may be determined that storage-side intermediate cache 406 becomes overloaded when the number of I/O requests in the pending I/O queue exceeds a certain threshold. Under these circumstances, whether storage-side intermediate cache 406 is overloaded may be ascertained by comparing the current number of I/O requests in the queue for cache 406 to the threshold.

Proactively Avoiding Overload

As mentioned above, even though items may currently reside in storage-side intermediate cache 406, storage system 104 retrieves the items from disk 112 when storage-side intermediate cache 406 is overloaded. Further, even when retrieval of items from storage-side intermediate cache 406 is not overloaded, it may be preferable to retrieve the items from disk 112 to avoid placing storage-side intermediate cache 406 in an overloaded state. For example, if the scans of T1 and T2 are low priority, it may be preferable to retrieve the items from T1 and T2 from disk 112 even when storage-side intermediate cache 406 is not overloaded. Because the items from T1 and T2 are retrieved from disk 112, that storage-side intermediate cache 406 will not become overloaded if storage system 104 is subsequently issued I/O requests for a high-priority scan of table T3.

According to one embodiment, storage system 114 proactively avoids overloading cache 406 by limiting use of cache 406 to "high priority" I/O requests. In one embodiment, storage system 104 determines whether an I/O request is high priority based on one or more of the logical characteristics associated with the I/O request. As mentioned above, such logical characteristics may include the identity of the user for whom the I/O request was submitted, the service that submitted the I/O request, the database targeted by the I/O request, an indication of a consumer group to which the I/O request maps, the reason why the I/O request was issued, a priority category of the I/O request, etc.

Figure 2:
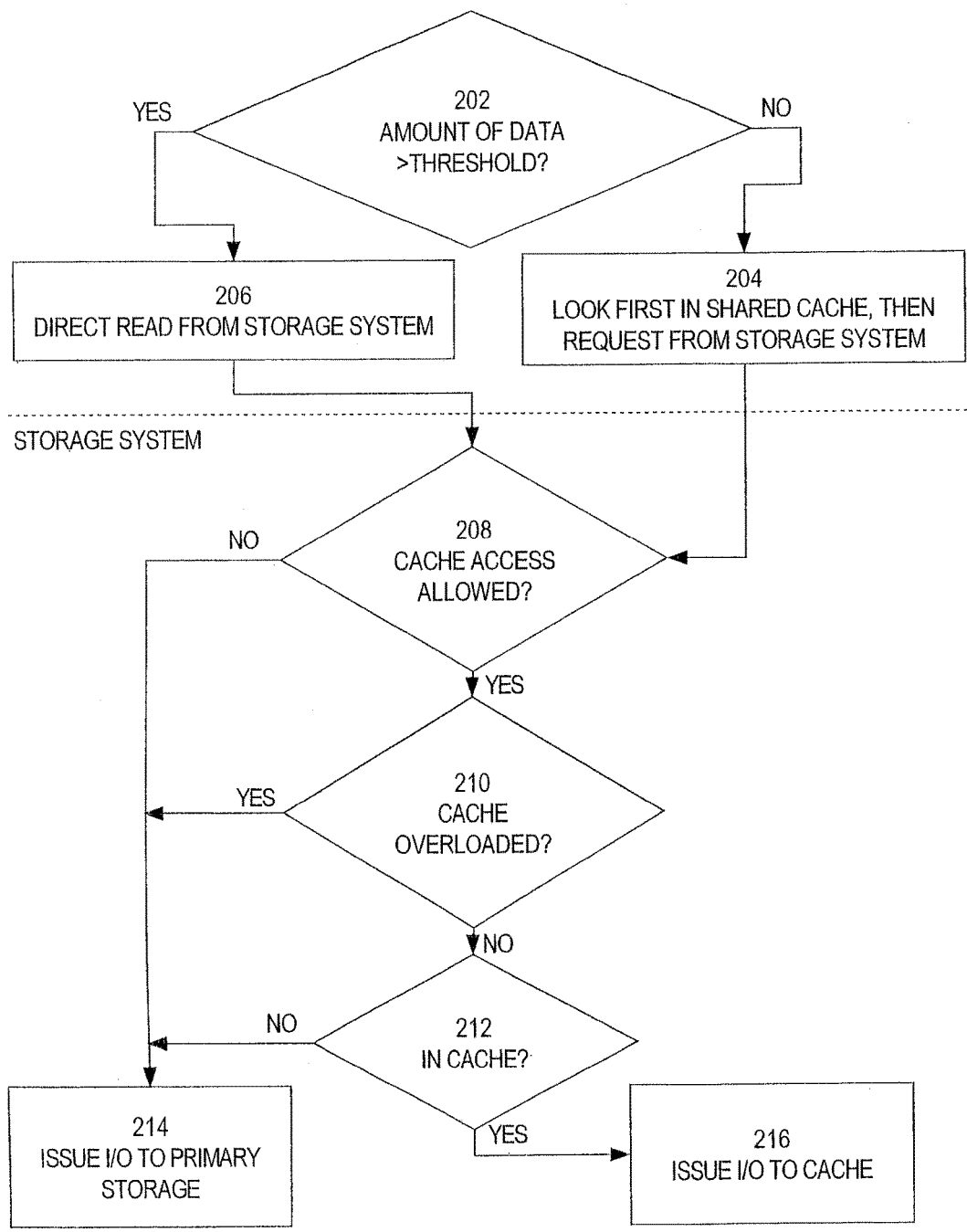
FIG. 2 is a flowchart illustrating steps for servicing an I/O request, according to an embodiment of the invention.

FIG. 2 is a flowchart illustrating how I/O requests may be handled in an embodiment that uses logical characteristics to proactively avoid overloading cache 406. Referring to FIG. 2, at step 202 the database server 102 determines whether the amount of data involved in an operation exceeds a particular threshold. If the amount of data involved in the operation exceeds the threshold, then at step 206, the database server 102 performs a direct read operation. As mentioned above, as part of the direct read operation, database server 102 may flush to disk 112 dirty copies of items that are involved in the operation. To perform the direct read operation, the database server 102 sends to storage system 104 I/O requests. The I/O requests are accompanied by metadata that indicates one or more logical characteristics about the I/O requests. Control then proceeds to step 208.

If, at step 202, the amount of data involved in the operation does not exceed the threshold, then database server 102 first looks for items in shared cache 108. If the items reside in shared cache 108, the items are retrieved from shared cache 108 without requesting the items from storage system 104. For items that are not found in shared cache 108, database server issues I/O requests to storage system 104. Thus, if the amount of data involved in the operation does not exceed the threshold, database server 102 only issues requests to storage system 104 for items not otherwise found in shared cache 108. The I/O requests that are issued to the storage system 104, if any, are accompanied by metadata that indicates one or more logical characteristics about the I/O requests. Control then proceeds to step 208.

At step 208, the storage system 104 determines, based on the one or more logical characteristics and cache access policies, whether the I/O request is allowed to be serviced by intermediate cache 406 (i.e. whether the I/O request is a "priority" I/O request). If the I/O request is a priority I/O request (e.g. the I/O request is associated with a priority database, user, workload, etc.) then control proceeds to step 210. If the I/O request is not a priority I/O request, then control proceeds to step 214.

At step 210, the storage server 104 determines whether the intermediate cache 406 is overloaded. If the intermediate cache 406 is overloaded, then control proceeds to step 214. If the intermediate cache 406 is not overloaded, then control proceeds to step 212.

At step 212, it is determined whether a copy of the item that is requested by the I/O resides in cache 406. If a copy of the item that is requested by the I/O resides in cache 406, then at step 216 the storage system 104 issues the I/O request to cache 406. If a copy of the item that is requested by the I/O does not reside in cache 406, then control passes to step 214.

It should be noted that the specific sequence of tests illustrated in FIG. 2 is merely one example. In alternative embodiments, the storage server 104 may first check to see if the item is in cache 406 (step 212), and only perform steps 208 and 210 after it is determined that the item resides in cache 406. As another alternative, storage server 104 may first check to see if cache 406 is overloaded (step 210), and only proceed to steps 208 and 212 once it is determined that cache 406 is not currently overloaded.

Offloading Filters

Often, requests to retrieve items are accompanied by filter criteria. Only items that satisfy the filter criteria are needed to satisfy the requests. In the context of a database system, the filter criteria are typically specified within a predicate of a database statement. For example, a database statement may request all rows from a table T where the value in the salary column is greater than 100,000. Conventionally, database server 102 would apply the filter criteria after receiving all of the items of table T from storage system 104. Specifically database server 102 would request blocks containing all rows of table T from storage system 104 and then apply the filter criteria to identify the subset of rows that were actually requested.

However, according to one embodiment, database server 102 "offloads" filters by communicating the filter criteria to storage system 104. When provided filter criteria in this manner, storage system 104 applies the filter criteria before sending blocks back to database server 102. Offloading filters in this manner reduces the overhead incurred by the database server 102 during scan operations, and may significantly reduce the amount of data that has to be transferred from the storage system 104 to the database server 102. In one embodiment, scans are offloaded when a direct read is being used to perform a scan.

Use of Cache for Scans Involving Offloaded Filters

According to one embodiment, one factor that is taken into account by the storage system 104 when determining whether cache access is allowed (step 208) is whether the I/O is for an operation for which a filter has been offloaded to the storage system 104. If the I/O is for an operation that does not have an offloaded filter, it is possible for the cache 406 to produce items faster than the items can be consumed by the database server 102. Thus, under these circumstances, in situations involving large scans with no offloaded filters, the storage system 104 may choose to issue the I/Os to disk 112 instead of cache 406, even though copies of the items requested in the I/Os may reside in cache 406.

On the other hand, storage system 104 may issue I/Os to cache 406 for even large scans when storage system 104 is applying one or more offloaded filters. Because the storage system may send significantly fewer items to the database server 102 due to the filtering, it is less likely that the database server 102 will not be able to consume the items at the rate that the items are produced by the storage system 104 after the items have been retrieved from the cache 406.

Concurrent Scanning

Of course, in addition to serving data from the intermediate cache 406, the storage system 104 also has the capability to fetch the data being scanned from the hard disks (e.g. disk 112). The ability to concurrently scan from both the intermediate cache 406 that is caching the data for the object being scanned, and the hard disk which also stores the object being scanned, is very useful.

The performance delivered by the storage system 104 is additive when it fetches scanned data from the intermediate cache 406 and hard disks 112. For example, if the storage system 104 can fetch data from the hard disks as x GB/s and fetch data from the intermediate cache 406 at y GB/s, now, by fetching data from both the hard disks and the intermediate cache 406 concurrently, the storage system 104 can fetch data for the object being scanned at (x+y) GB/s. The storage system 104 has the unique capability to utilize both the maximum intermediate cache 406 bandwidth and the maximum hard disk bandwidth to scan an object and give an additive maximum bandwidth while scanning concurrently from both.

According to one embodiment, when the database server 102 sends a read or write request to storage system 104, the request includes additional information in the request about whether the data is likely to be assessed again, and should be cached. For example, when writing data to a log file or to a mirrored copy, the database server sends a hint to skip caching. When reading a table index, the database sends a hint to cache the data. This cooperation allows optimized usage of intermediate cache 406 space to store only the most frequently accessed data.

In the case of scanning a database object, the KEEP hint is passed to the storage system along with the request for data. The storage system is aware that this database object resides both on disk as well as is cached in the intermediate cache 406. The request for the data of the scanned object is broken up and sent to the hard disks and the intermediate cache 406 at the same time. The data read from the hard disks and the intermediate cache 406 is then processed and returned back to the client. Given that the speeds of the intermediate cache 406 and the hard disks is different, the storage system is smart to queue less data requests on the hard disks when compared to the intermediate cache 406. The performance delivered for scans by the storage system is achieved through the effective utilization and concurrent scheduling and reaping of requests for data on both the intermediate cache 406 and hard disks.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
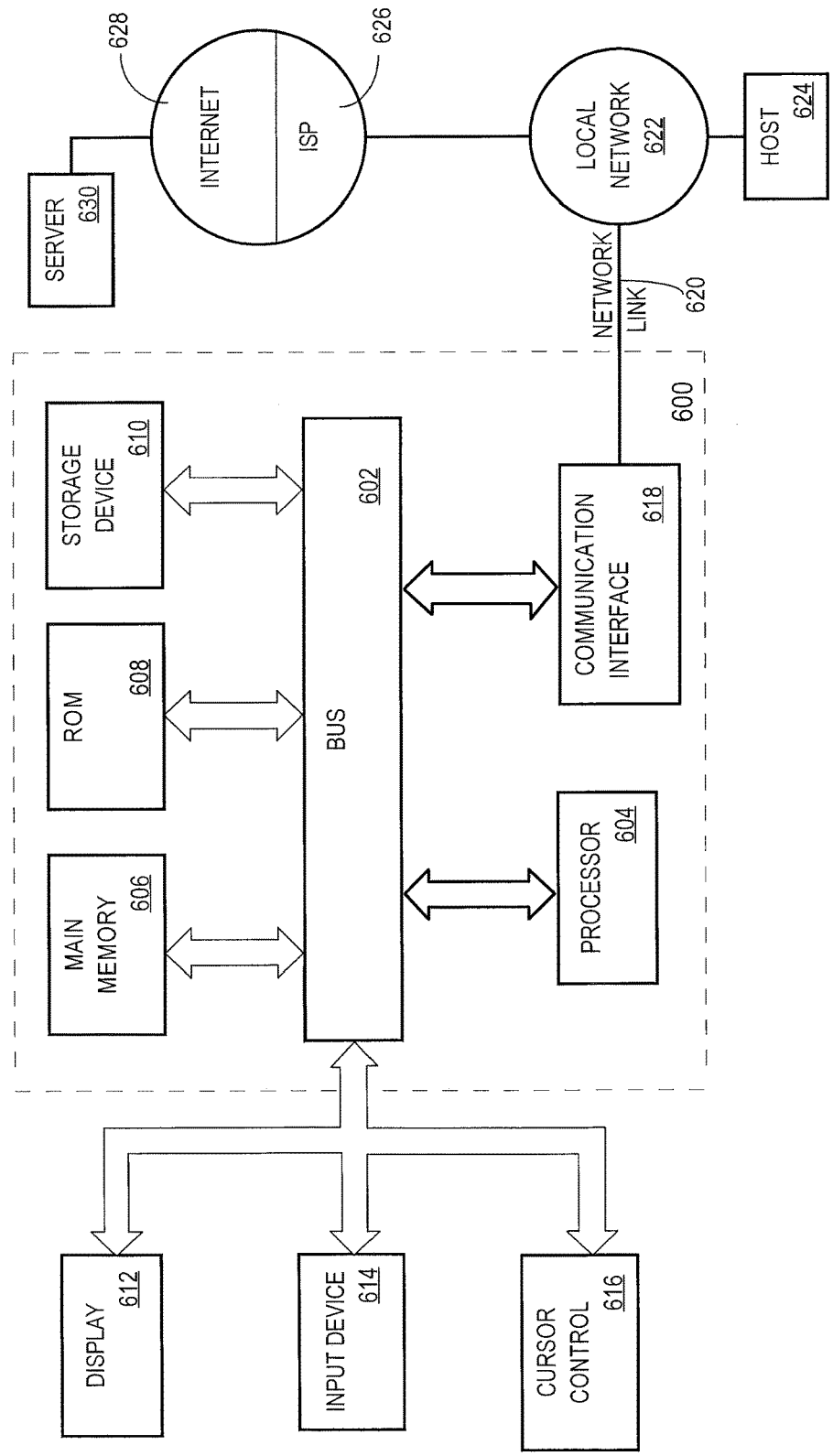
FIG. 6 is a block diagram upon which the techniques described herein may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising, during a period in which an intermediate cache is already storing a copy of a particular item and a particular cache is not storing the particular item:
    receiving an I/O request at a storage system, from a database server executing in a computer system that includes volatile memory;
    wherein the volatile memory has at least a portion that is used as the particular cache;
    wherein the I/O request is to retrieve, for a scan operation being performed by the database server, a plurality of items that includes the particular item;
    wherein the particular item resides on persistent primary storage managed by the storage system;
    wherein the intermediate cache, managed by the storage system, is logically positioned between the volatile memory of the computer system and the persistent primary storage;
    in response to receiving the I/O request, the storage system performing the steps of:
        determining whether to service the I/O request with the copy of the particular item that resides in the intermediate cache based on one or more factors, wherein the one or more factors include at least one of:
            an identity of a user for whom the I/O request was submitted,
            an identity of a service that submitted the I/O request,
            an indication of a consumer group to which the I/O request maps,
            whether the I/O request is associated with an offloaded filter provided by the database server to the storage system, or
            whether the intermediate cache is overloaded;
        in response to determining, based on the one or more factors, that the I/O request should be serviced with the copy of the particular item that resides in the intermediate cache, responding to the I/O request with the copy of the particular item that resides the intermediate cache without retrieving the particular item from primary storage;
    wherein the storage system applies filter criteria, provided to the storage system by the database server, to items involved in the scan operation; and
    wherein the method is performed by one or more computing devices.

2. A method comprising, during a period in which an intermediate cache is already storing a copy of an item and a particular cache is not storing the item:
    receiving at a storage system, from a database server executing in a computer system that includes volatile memory, at least a portion of which is used as the particular cache, an I/O request;
    wherein the I/O request is to retrieve the item that resides on persistent primary storage managed by the storage system;
    wherein the intermediate cache, managed by the storage system, is logically positioned between the volatile memory of the computer system and the persistent primary storage;
    in response to receiving the I/O request, the storage system performing the steps of:
        determining whether to service the I/O request with the copy of the item that resides in the intermediate cache based, at least in part, on an identity of a user for whom the I/O request was submitted;
        in response to determining, based, at least in part, on the identity of the user for whom the I/O request was submitted, that the I/O request should be serviced with the copy of the item that resides in the intermediate cache, responding to the I/O request with the copy of the item that resides the intermediate cache without retrieving the item from primary storage;
    wherein the method is performed by one or more computing devices.

3. A method comprising, during a period in which an intermediate cache is already storing a copy of an item and a particular cache is not storing the item:
    receiving at a storage system, from a database server executing in a computer system that includes volatile memory, at least a portion of which is used as the articular cache, an I/O request;
    wherein the I/O request is to retrieve the item that resides on persistent primary storage managed by the storage system;
    wherein the intermediate cache, managed by the storage system, is logically positioned between the volatile memory of the computer system and the persistent primary storage;
    in response to receiving the I/O request, the storage system performing the steps of:
        determining whether to service the I/O request with the copy of the item that resides in the intermediate cache based, at least in part, on an identity of a service that submitted the I/O request;
        in response to determining, based, at least in part, on the identity of the service that submitted the I/O request, that the I/O request should be serviced with the copy of the item that resides in the intermediate cache, responding to the I/O request with the copy of the item that resides the intermediate cache without retrieving the item from primary storage;
    wherein the method is performed by one or more computing devices.

4. A method comprising, during a period in which an intermediate cache is already storing a copy of an item and a particular cache is not storing the item:
    receiving at a storage system, from a database server executing in a computer system that includes volatile memory, at least a portion of which is used as the particular cache, an I/O request;
    wherein the I/O request is to retrieve the item that resides on persistent primary storage managed by the storage system;

wherein the intermediate cache, managed by the storage system, is logically positioned between the volatile memory of the computer system and the persistent primary storage;

in response to receiving the I/O request, the storage system performing the steps of:

determining whether to service the I/O request with the copy of the item that resides in the intermediate cache based, at least in part, on an indication of a consumer group to which the I/O request maps;

in response to determining, based, at least in part, on the indication of the consumer group to which the I/O request maps, that the I/O request should be serviced with the copy of the item that resides in the intermediate cache, responding to the I/O request with the copy of the item that resides the intermediate cache without retrieving the item from primary storage;

wherein the method is performed by one or more computing devices.

5. A method comprising, during a period in which an intermediate cache is already storing a copy of an item and a particular cache is not storing the item:

receiving at a storage system, from a database server executing in a computer system that includes volatile memory, at least a portion of which is used as the particular cache, an I/O request;

wherein the I/O request is to retrieve the item that resides on persistent primary storage managed by the storage system;

wherein the intermediate cache, managed by the storage system, is logically positioned between the volatile memory of the computer system and the persistent primary storage;

in response to receiving the I/O request, the storage system performing the steps of:

determining whether to service the I/O request with the copy of the item that resides in the intermediate cache based, at least in part, on whether the I/O request is associated with an offloaded filter provided by the database server to the storage system;

in response to determining, based, at least in part, on whether the I/O request is associated with an offloaded filter provided by the database server to the storage system, that the I/O request should be serviced with the copy of the item that resides in the intermediate cache, responding to the I/O request with the copy of the item that resides the intermediate cache without retrieving the item from primary storage;

wherein the method is performed by one or more computing devices.

6. A method comprising:

receiving from a database server, at a storage system, an I/O request for an item that resides on primary storage but that does not currently reside in an intermediate cache;

in response to the I/O request, the storage system performing the steps of:

retrieving the item from the primary storage;

providing the item to the database server; and performing one of:

a) storing a copy of the item in the intermediate cache responsive to an identity of a user for whom the I/O request was submitted belonging to a particular set of user identities, b) storing a copy of the item in the intermediate cache responsive to an identity of a service that submitted the I/O request belonging to a particular set of service identities, or c) storing a copy of the item in the intermediate cache responsive to an indication of a consumer group to which the I/O request maps indicating that the consumer group belongs to a particular set of service groups;

wherein the method is performed by one or more computing devices.

7. The method of claim 6 wherein, in response to the I/O request, the storage system stores a copy of the item in the intermediate cache responsive to an identity of the user for whom the I/O request was submitted belonging to the particular set of user identities.

8. The method of claim 6 wherein, in response to the I/O request, the storage system stores a copy of the item in the intermediate cache responsive to an identity of the service that submitted the I/O request belonging to the particular set of service identities.

9. The method of claim 6 wherein, in response to the I/O request, the storage system stores a copy of the item in the intermediate cache responsive to an indication of the consumer group to which the I/O request maps indicating that the consumer group belongs to the particular set of service groups.

10. One or more non-transitory computer-readable media storing instructions that, when executed by one or more processors, cause, during a period in which an intermediate cache is already storing a copy of a particular item and a particular cache is not storing the particular item:

receiving an I/O request at a storage system, from a database server executing in a computer system that includes volatile memory;

wherein the volatile memory has at least a portion that is used as the particular cache;

wherein the I/O request is to retrieve, for a scan operation being performed by the database server, a plurality of items that includes the particular item;

wherein the particular item resides on persistent primary storage managed by the storage system;

wherein the intermediate cache, managed by the storage system, is logically positioned between the volatile memory of the computer system and the persistent primary storage;

in response to receiving the I/O request, the storage system performing the steps of:

determining whether to service the I/O request with the copy of the particular item that resides in the intermediate cache based on one or more factors, wherein the one or more factors include at least one of:

an identity of a user for whom the I/O request was submitted, an identity of a service that submitted the I/O request, an indication of a consumer group to which the I/O request maps, whether the I/O request is associated with an offloaded filter provided by the database server to the storage system, or whether the intermediate cache is overloaded;

in response to determining, based on the one or more factors, that the I/O request should be serviced with the copy of the particular item that resides in the intermediate cache, responding to the I/O request with the copy of the particular item that resides the intermediate cache without retrieving the particular item from primary storage;

wherein the storage system applies filter criteria, provided to the storage system by the database server, to items involved in the scan operation.

11. One or more non-transitory computer-readable media storing instructions that, when executed by one or more processors, cause, during a period in which an intermediate cache is already storing a copy of an item and a particular cache is not storing the item:

receiving at a storage system, from a database server executing in a computer system that includes volatile memory, at least a portion of which is used as the particular cache, an I/O request;

wherein the I/O request is to retrieve the item that resides on persistent primary storage managed by the storage system;

wherein the intermediate cache, managed by the storage system, is logically positioned between the volatile memory of the computer system and the persistent primary storage;

in response to receiving the I/O request, the storage system performing the steps of:

determining whether to service the I/O request with the copy of the item that resides in the intermediate cache based, at least in part, on an identity of a user for whom the I/O request was submitted;

in response to determining, based, at least in part, on the identity of the user for whom the I/O request was submitted, that the I/O request should be serviced with the copy of the item that resides in the intermediate cache, responding to the I/O request with the copy of the item that resides the intermediate cache without retrieving the item from primary storage.

12. One or more non-transitory computer-readable media storing instructions that, when executed by one or more processors, cause, during a period in which an intermediate cache is already storing a copy of an item and a particular cache is not storing the item:

receiving at a storage system, from a database server executing in a computer system that includes volatile memory, at least a portion of which is used as the particular cache, an I/O request;

wherein the I/O request is to retrieve the item that resides on persistent primary storage managed by the storage system;

wherein the intermediate cache, managed by the storage system, is logically positioned between the volatile memory of the computer system and the persistent primary storage;

in response to receiving the I/O request, the storage system performing the steps of:

determining whether to service the I/O request with the copy of the item that resides in the intermediate cache based, at least in part, on an identity of a service that submitted the I/O request;

in response to determining, based, at least in part, on the identity of the service that submitted the I/O request, that the I/O request should be serviced with the copy of the item that resides in the intermediate cache, responding to the I/O request with the copy of the item that resides the intermediate cache without retrieving the item from primary storage.

13. One or more non-transitory computer-readable media storing instructions that, when executed by one or more processors, cause, during a period in which an intermediate cache is already storing a copy of an item and a particular cache is not storing the item:

receiving at a storage system, from a database server executing in a computer system that includes volatile memory, at least a portion of which is used as the particular cache, an I/O request;

wherein the I/O request is to retrieve the item that resides on persistent primary storage managed by the storage system;

wherein the intermediate cache, managed by the storage system, is logically positioned between the volatile memory of the computer system and the persistent primary storage;

in response to receiving the I/O request, the storage system performing the steps of:

determining whether to service the I/O request with the copy of the item that resides in the intermediate cache based, at least in part, on an indication of a consumer group to which the I/O request maps;

in response to determining, based, at least in part, on the indication of the consumer group to which the I/O request maps, that the I/O request should be serviced with the copy of the item that resides in the intermediate cache, responding to the I/O request with the copy of the item that resides the intermediate cache without retrieving the item from primary storage.

14. One or more non-transitory computer-readable media storing instructions that, when executed by one or more processors, cause, during a period in which an intermediate cache is already storing a copy of an item and a particular cache is not storing the item:

receiving at a storage system, from a database server executing in a computer system that includes volatile memory, at least a portion of which is used as the particular cache, an I/O request;

wherein the I/O request is to retrieve the item that resides on persistent primary storage managed by the storage system;

wherein the intermediate cache, managed by the storage system, is logically positioned between the volatile memory of the computer system and the persistent primary storage;

in response to receiving the I/O request, the storage system performing the steps of:

determining whether to service the I/O request with the copy of the item that resides in the intermediate cache based, at least in part, on whether the I/O request is associated with an offloaded filter provided by the database server to the storage system;

in response to determining, based, at least in part, on whether the I/O request is associated with an offloaded filter provided by the database server to the storage system, that the I/O request should be serviced with the copy of the item that resides in the intermediate cache, responding to the I/O request with the copy of the item that resides the intermediate cache without retrieving the item from primary storage.

15. One or more non-transitory computer-readable media storing instructions that, when executed by one or more processors, cause:

receiving from a database server, at a storage system, an I/O request for an item that resides on primary storage but that does not currently reside in an intermediate cache;

in response to the I/O request, the storage system performing the steps of:
retrieving the item from the primary storage;
providing the item to the database server; and
performing one of:
  a) storing a copy of the item in the intermediate cache responsive to an identity of a user for whom the I/O request was submitted belonging to a particular set of user identities,
  b) storing a copy of the item in the intermediate cache responsive to an identity of a service that submitted the I/O request belonging to a particular set of service identities, or
  c) storing a copy of the item in the intermediate cache responsive to an indication of a consumer group to which the I/O request maps indicating that the consumer group belongs to a particular set of service groups.

16. The one or more non-transitory computer-readable media of claim 15 wherein the performing comprises: in response to the I/O request, the storage system stores a copy of the item in the intermediate cache responsive to an identity of the user for whom the I/O request was submitted belonging to the particular set of user identities.

17. The one or more non-transitory computer-readable media of claim 15 wherein the performing comprises: in response to the I/O request, the storage system stores a copy of the item in the intermediate cache responsive to an identity of the service that submitted the I/O request belonging to the particular set of service identities.

18. The one or more non-transitory computer-readable media of claim 15 wherein the performing comprises: in response to the I/O request, the storage system stores a copy of the item in the intermediate cache responsive to an indication of the consumer group to which the I/O request maps indicating that the consumer group belongs to the particular set of service groups.

* * * * *

UNITED STATES PATENT AND TRADEMARK OFFICE
CERTIFICATE OF CORRECTION

PATENT NO.       : 10,430,338 B2
APPLICATION NO.  : 12/691146
DATED            : October 1, 2019
INVENTOR(S)      : Umamageswaran et al.

It is certified that error appears in the above-identified patent and that said Letters Patent is hereby corrected as shown below:

On the Title Page

Column 2, item (56) under Other Publications, Line 1, delete "Internationational" and insert -- International --, therefor.

In the Specification

In Column 1, Line 11, delete "Oct. 9, 2009." and insert -- Nov. 9, 2009. --, therefor.

In Column 6, Line 22, delete "used" and insert -- used. --, therefor.

In Column 9, Line 39, delete "-Road" and insert -- -Read --, therefor.

In the Claims

In Column 22, Line 35, in Claim 3, delete "articular" and insert -- particular --, therefor.

Signed and Sealed this
Eighth Day of September, 2020

Andrei Iancu
*Director of the United States Patent and Trademark Office*